(12) United States Patent
Imai et al.

(10) Patent No.: US 7,698,855 B2
(45) Date of Patent: Apr. 20, 2010

(54) SLIDING-DOOR OPENING CONTROL APPARATUS

(75) Inventors: Takuya Imai, Yamanashi (JP); Tsunenori Senbongi, Yamanashi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 962 days.

(21) Appl. No.: 11/280,334

(22) Filed: Nov. 17, 2005

(65) Prior Publication Data

US 2006/0107598 A1    May 25, 2006

(30) Foreign Application Priority Data

Nov. 24, 2004   (JP)   ............................. 2004-338471

(51) Int. Cl.
*E05F 11/00* (2006.01)
(52) U.S. Cl. ......................................... 49/360; 296/155
(58) Field of Classification Search .................. 49/360, 49/324, 209, 322; 296/155
See application file for complete search history.

(56) References Cited

U.S. PATENT DOCUMENTS

| | | | |
|---|---|---|---|
| 4,916,861 A * | 4/1990 | Schap | 49/31 |
| 6,178,699 B1 * | 1/2001 | Kawanobe et al. | 49/360 |
| 6,208,102 B1 * | 3/2001 | Kikuchi et al. | 318/466 |
| 6,729,071 B1 * | 5/2004 | Kawanobe et al. | 49/360 |
| 7,267,391 B2 * | 9/2007 | Yokomori | 296/155 |
| 2003/0046872 A1 * | 3/2003 | Fukumura et al. | 49/360 |
| 2004/0103585 A1 * | 6/2004 | Yokomori | 49/360 |
| 2004/0123525 A1 * | 7/2004 | Suzuki et al. | 49/360 |
| 2005/0102905 A1 * | 5/2005 | Ichinose | 49/360 |
| 2005/0161973 A1 * | 7/2005 | Yokomori | 296/155 |
| 2006/0048451 A1 * | 3/2006 | Fukumura et al. | 49/360 |
| 2006/0150515 A1 * | 7/2006 | Shiga | 49/360 |

FOREIGN PATENT DOCUMENTS

JP           3576483 B2      7/2004

* cited by examiner

*Primary Examiner*—Katherine W Mitchell
*Assistant Examiner*—Catherine A Kelly
(74) *Attorney, Agent, or Firm*—Sughrue Mion, PLLC

(57) ABSTRACT

A opening control apparatus for a sliding door of a vehicle, includes a driving source, a clutch arranged to connect the driving source and the sliding door in an engaged state and to disconnect the driving source and the sliding door in a disengaged state, and a control section. The control section brings the clutch from the disengaged state to the engaged state when a measured distance of movement of the sliding door from a stop position to a position in one of an opening direction and a closing direction reaches a first predetermined distance and then a measured distance of movement of the sliding door from the position in the one of the opening and closing directions reaches a second predetermined distance, and drives the sliding door to move in the one of the opening and closing directions by the driving source.

13 Claims, 3 Drawing Sheets

SLIDING-DOOR OPENING CONTROL APPARATUS

BACKGROUND OF THE INVENTION

The present invention relates to an opening control apparatus for a sliding door of a vehicle.

Japanese Patent No. 3576483 shows an opening control apparatus for a sliding door of a vehicle. In this control apparatus, when the vehicle is stopped at a slope, a movement sensing section senses a movement of the sliding door stopping at an open position in a slope direction by self weight. Then, the control apparatus controls an electromagnetic clutch to be changed from a disengaged state to an engaged state by energizing the electromagnetic clutch, and simultaneously drives the sliding door in a moving direction at a safety speed by a driving force of a motor so that the sliding door is not moved at a high speed in an opening direction or a closing direction.

SUMMARY OF THE INVENTION

However, in the opening control apparatus mentioned above, when the movement sensing section senses a movement of the sliding door while the electromagnetic clutch is in the disengaged state, the control apparatus drives the sliding door immediately by operating the electromagnetic clutch and the motor irrespective of a movement distance and a movement speed of the sliding door. Therefore, even when the vehicle is stopped at gentle slope or flat road and even when the sliding door is slightly moved in response to wind or vibration when occupants get on and off the vehicle and subsequently may not be moved, the control apparatus drives the sliding door by operating the electromagnetic clutch and the motor as if the vehicle is stopped at the slope at which the sliding door may be moved at the high speed in the slope direction. There is a problem of driving the sliding door needlessly.

It is an object of the present invention to provide an opening control apparatus for a sliding door of a vehicle configured to drive the sliding door safely by a driving force of a driving source only in a case in which the sliding door may be moved in a slope direction by self weight at a high speed.

According to one aspect of the present invention, a sliding-door opening control apparatus for a vehicle, comprises: a sliding door arranged to be moved in an opening direction and a closing direction along a side face of the vehicle; a driving source arranged to drive the sliding door to move in the opening direction and the closing direction; a clutch arranged to connect the driving source and the sliding door in an engaged state and to disconnect the driving source and the sliding door in a disengaged state; and a control section configured to control the driving source and the clutch, to measure a distance of movement of the sliding door in the opening direction and the closing direction. The control section is configured to control movement of the door by bringing the clutch from the disengaged state to the engaged state when a measured distance of movement of the sliding door from a stop position to a position in one of the opening direction and the closing direction reaches a first predetermined distance within a predetermined period of time and then a measured distance of movement of the sliding door from the position in the one of the opening direction and the closing direction reaches a second predetermined distance; and bringing the sliding door in the one of the opening direction and the closing direction by the driving source.

According to another aspect of the invention, a sliding-door opening control apparatus for a vehicle comprises: a sliding door arranged to be moved in an opening direction and a closing direction along a side face of the vehicle; first means for driving the sliding door to move in the opening direction and the closing direction; second means for connecting the first means and the sliding door in a first state, and disconnecting the first means and the sliding door in a second state; and third means for controlling the first means and the second means, measuring a distance of movement of the sliding door in the opening direction and the closing direction, and performing a door movement sensing drive control to bring the second means from the second state to the first state when a measured distance of movement of the sliding door from a stop position to a position in one of the opening direction and the closing direction reaches a first predetermined distance within a predetermined time from a time at which the sliding door is stopped at the stop position and then a measured distance of movement of the sliding door from the position in the one of the opening direction and the closing direction reaches a second predetermined distance, and to drive the sliding door to move in the one of the opening direction and the closing direction by the first means.

According to still another aspect of the invention, an opening control method for a vehicle including a sliding door arranged to be moved in an opening direction and a closing direction along a side face of the vehicle, a driving source arranged to drive the sliding door to move in the opening direction and the closing direction, and a clutch arranged to connect the driving source and the sliding door in an engaged state and to disconnect the driving source and the sliding door in a disengaged state, the opening control method comprising: controlling the driving source and the clutch; measuring a distance of movement of the sliding door in the opening direction and the closing direction; and performing a door movement sensing drive control to bring the clutch from the disengaged state to the engaged state when a measured distance of movement of the sliding door from a stop position to a position in one of the opening direction and the closing direction reaches a first predetermined distance and then a measured distance of movement of the sliding door from the position in the one of the opening direction and the closing direction reaches a second predetermined distance, and to drive the sliding door to move in the one of the opening direction and the closing direction by the driving source.

DETAILED DESCRIPTION OF THE INVENTION

Figure 1:
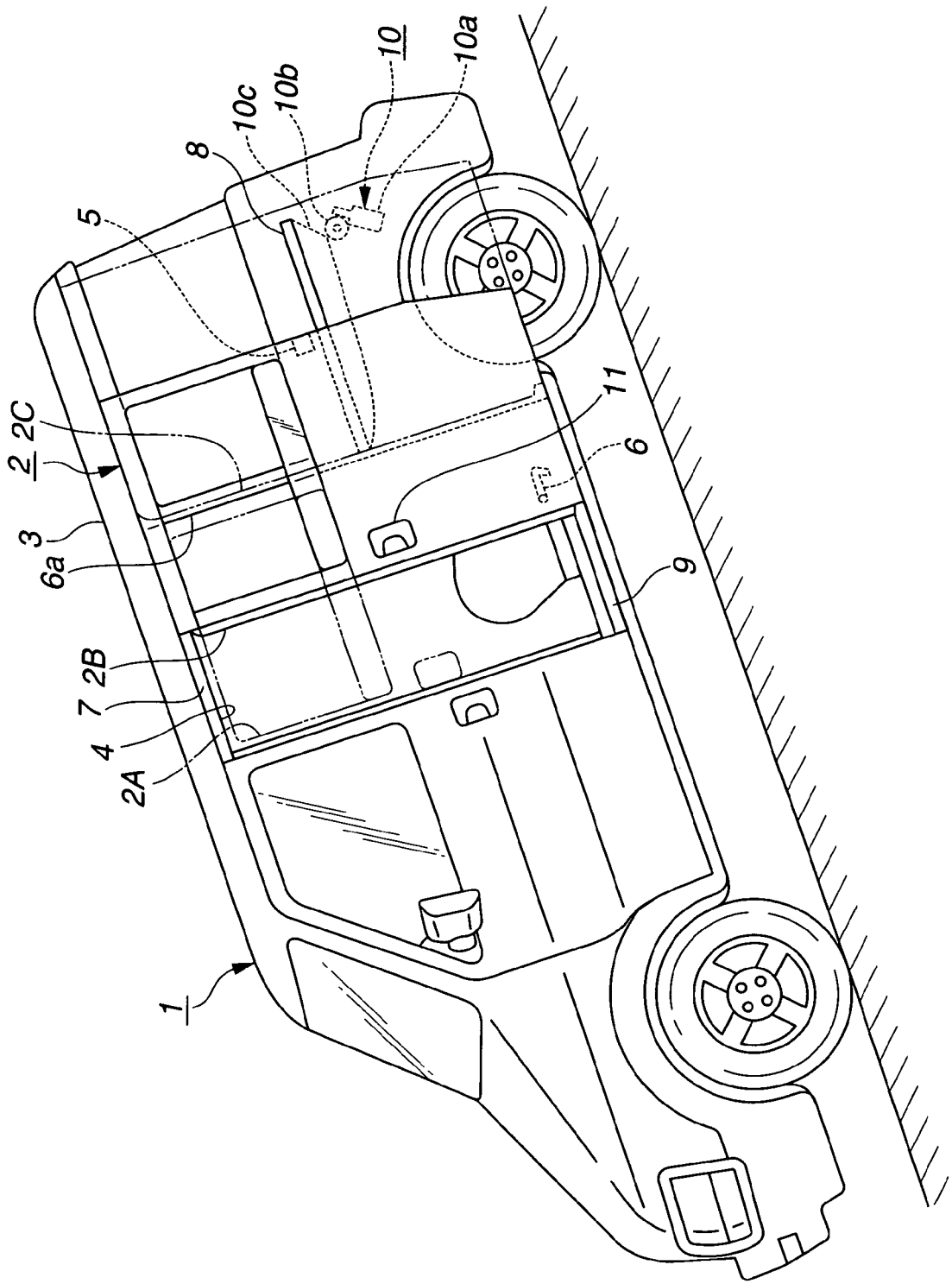
FIG. 1 is a side view showing a vehicle equipped with a control apparatus for a sliding door according to one embodiment of the present invention.
Figure 2:
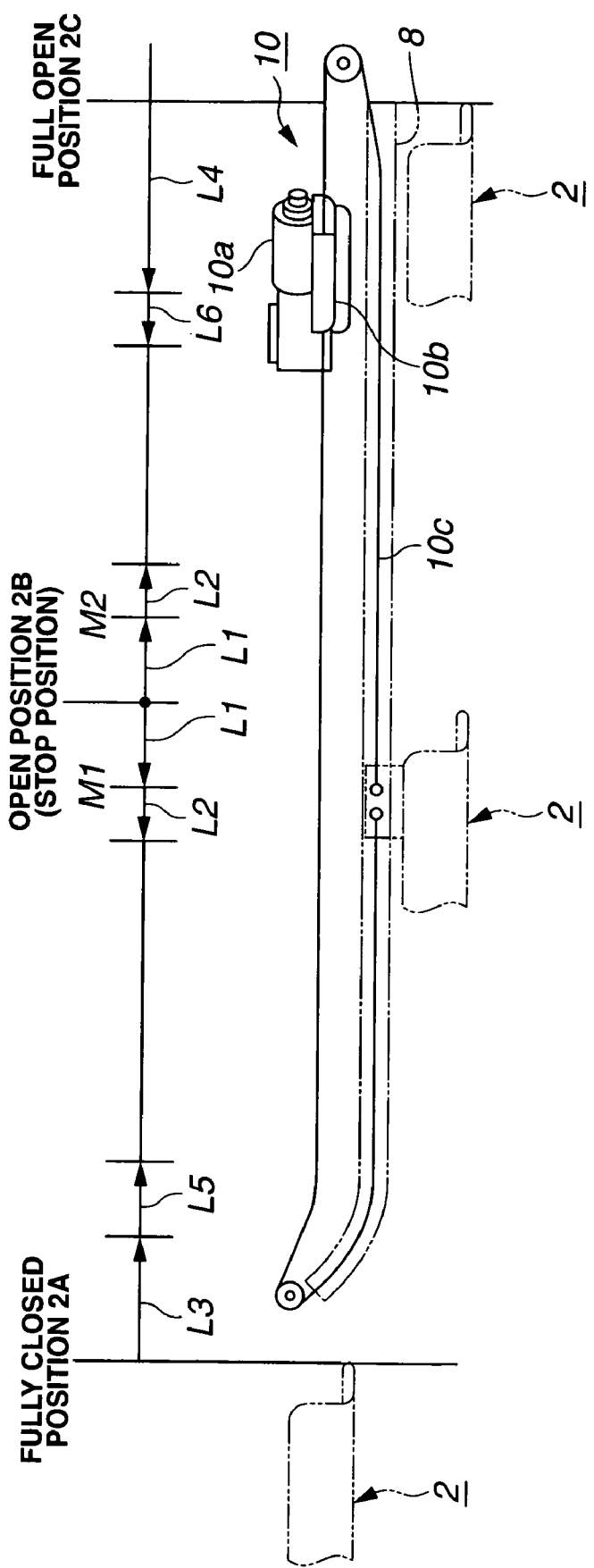
FIG. 2 is a schematic plan view showing a movement state of the sliding door of FIG. 1.
Figure 3:
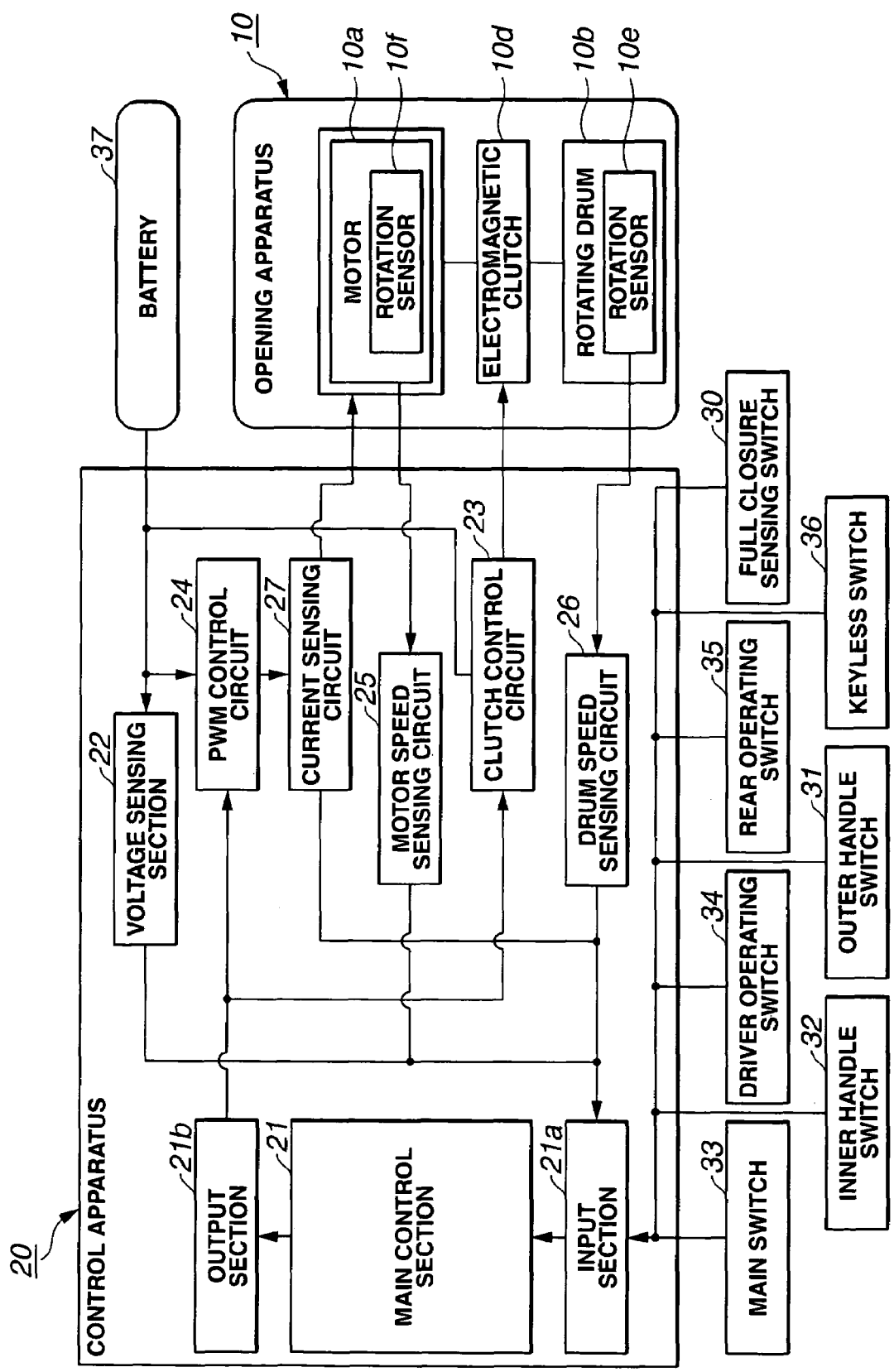
FIG. 3 is block diagrams showing a control circuit according to the embodiment of the present invention.

FIG. 1 shows, in section, a vehicle equipped with an opening control apparatus for a sliding door according to one embodiment of the present invention. FIG. 2 shows a plan view illustrating a movement state of the sliding door according to the embodiment of the present invention. FIG. 3 shows a block diagram showing a control circuit according to the embodiment of the present invention. Hereinafter, a leftward direction as viewed in FIGS. 1 and 2 is a forward direction of the vehicle, and a rightward direction as viewed in FIGS. 1 and 2 is a rearward direction of the vehicle.

As shown in FIG. 1, a vehicle 1 is a vehicle of a minivan or wagon type with a sliding door 2. Sliding door 2 is supported by guide rails 7, 8 and 9 fixed to a vehicle body 3, and arranged to extend in forward and backward directions, at upper, middle and lower portions respectively. Sliding door 2 is arranged to open and close a door opening 4 in the forward and rearward directions. Door opening 4 is provided in a side face of vehicle body 3 for occupants who get on and off the vehicle. Sliding door 2 is moved by manual operation and motor operation (or motor driven operation) by a driving force of an opening apparatus 10 serving as a sliding door driving section as mentioned later. Sliding door 2 moves from a fully closed position 2A (shown in a phantom line of FIG. 1) at which door opening 4 is closed. Sliding door 2 further moves slightly outwardly with respect to the side surface of vehicle body 3, and then moves rearward along vehicle body 3 through open position 2B (shown in a solid line of FIG. 1) to a full open position 2C (shown in a chain line of FIG. 1). Conversely, sliding door 5 can move from full open position 2C to fully closed position 2A.

A fully closing latch device 5 is provided at a rear portion in sliding door 2. Fully closing latch device 5 is arranged to hold sliding door 5 at fully closed position 2A by engaging with a striker (not shown) fixed to a rear circumference (or a rear middle portion) of door opening 4. A fully opening latch device 6 is provided at a forward lower portion in sliding door 2. Fully opening latch device 6 is arranged to hold sliding door 5 at full open position 2C by engaging with a striker (not shown) fixed to the rear portion of lower guide rail 9.

Fully closing latch device 5 includes a full closure sensing switch 30 (as shown in FIG. 3) serving as a full closure sensing section configured to sense a rotational position of a latch (not shown) arranged to engage with the striker at fully closed position 2A of sliding door 2, and configured to generate a fully closed position signal corresponding to fully closed position 2A of sliding door 2.

Fully closing latch device 5 and fully opening latch device 6 are mechanically linked with an outer handle 11, an inner handle (not shown), and an electric actuator (not shown). Outer handle 11 is an operating handle provided at sliding door 2 on the outside of the vehicle. The inner handle is an operating handle provided at sliding door 2 on the inside of the vehicle. The electric actuator is provided within sliding door 2. Fully closing latch device 5 and fully opening latch device 6 are disengaged from the respective strikers by the release operation (or the unlocking operation) by the motions of the inner handle and outer handle 11 by the manual operation, or by the driving of the electric actuator by the electric operation, and thereby sliding door 2 can be moved in the opening and closing directions. The electric actuator is operated or driven in accordance with operation of one of a driver operating switch 34, a rear operating switch 35, and a wireless remote controller (not shown) as mentioned later.

Outer handle 11 is provided with an outer handle switch 31 serving as an operating handle sensing section configured to sense the motion of outer handle 11 by the manual operation.

Outer handle switch 31 senses the motion of outer handle 11 which moves sliding door 2 in the opening direction, in a state gripping outer handle 11 from the outside of the vehicle, and generates an opening operation signal. Outer handle switch 31 senses the motion of outer handle 11 which moves sliding door 2 in the closing direction, in the state gripping outer handle 11 from the outside of the vehicle, and generates a closing operation signal.

The inner handle is provided with an inner handle switch 32 serving as an operating handle sensing section capable of sensing the motion of the inner handle by the manual operation.

Inner handle switch 32 senses the motion of the inner handle which moves sliding door 2 in the opening direction, in a state gripping the inner handle from the inside of the vehicle, and generates the opening operation signal. Inner handle switch 32 senses the motion of the inner handle which moves sliding door 2 in the closing direction, in the state gripping the inner handle from the inside of the vehicle, and generates the closing operation signal.

Opening apparatus 10 is arranged to drive sliding door 2 to move in the opening and closing directions by the driving force of a driving source. Opening apparatus 10 includes a motor 10a, a rotating drum 10b, a cable 10c, and an electromagnetic clutch 10d (such as a friction clutch or a tooth clutch) as shown in FIG. 3. Motor 10a is enclosed inside a panel of vehicle body 3. Motor 10a serves as the driving source capable of rotating positively and reversely. Rotating drum 10b can rotate positively and reversely through a speed reducer (motor reducer) arranged to decelerate the rotation of motor 10a. Cable 10c is wound on rotating drum 10b, and connected with a rear end portion of sliding door 2. Rotating drum 10b is arranged to retract and feed cable 10c. Cable 10c extends along guide rail 8 at the middle portion. Electromagnetic clutch 10d is provided at a driving force transmitting path between the speed reducer and rotating drum 10b, and arranged to connect or disconnect the driving force transmitting path. When the driving force transmitting path is connected in an energized state of electromagnetic clutch 10d, the driving force of motor 10a can be transmitted through rotating drum 10b and cable 10c to sliding door 2. Accordingly, it is possible to drive sliding door 2 to be moved in the opening direction or the closing direction in accordance with the rotational directions of motor 10a.

When sliding door 2 is moved by the manual operation in the opening or closing direction while the driving force transmitting path is disconnected in a de-energized state of electromagnetic clutch 10d, motor 10a does not act as resistance force by reverse rotation of motor 10a against the movement of sliding door 2. Therefore, sliding door 2 can be lightly opened or closed by manual operation force.

Motor 10a and electromagnetic clutch 10d are controlled by a control apparatus 20 serving as a control section disposed near opening apparatus 10 as described later.

Rotating drum 10b rotates in synchronous with a movement direction, a movement speed, and a movement distance of sliding door 2. A rotary shaft of rotating drum 10b is provided with a rotation sensor 10e (or a movement signal generating section) configured to measure a rotation angle of the rotary shaft with high resolution.

Rotation sensor 10e generates a pulse signal in accordance with the rotation angle and the rotational direction of rotating drum 10b, and thereby measures a movement distance, a movement direction and a movement speed of cable 10c wound on rotating drum 10b, that is the movement distance, the movement direction and the movement speed of sliding door 2. The pulse signal from rotation sensor 10e is measured from fully closed position 2A of sliding door 2 used as an initial value to full open position 2C, and hence the count value corresponds to the position of sliding door 2.

FIG. 3 shows a block diagram illustrating a connection between electrical components of control apparatus 20, vehicle body 3 and sliding door 2.

Control apparatus 20 includes a main control section 21 configured to control motor 10a and electromagnetic clutch 10d of opening apparatus 10 by program control by a microcomputer. Control apparatus 20 is disposed near opening apparatus 10 within vehicle body 3.

Input section 21a of main control section 21 is electrically connected with operational systems of outer handle switch 31, inner handle switch 32, a main switch 33 and a driver operating switch 34 provided near a driver's seat, a rear operating switch 35 provided near a rear seat, and a keyless switch 36 configured to receive remote control signals for opening or closing operation from a wireless remote control. Moreover, input section 21a is electrically connected with sensing systems of full closure sensing switch 30, rotation sensor 10e configured to sense the rotation of rotating drum 10b, a rotation sensor 10f configured to sense the rotation of motor 10a, and a battery 37 mounted on vehicle body 3, and adapted to output direct voltage.

The output voltage of battery 37 is transformed into a digital signal by an A/D transducer (not shown), and sensed by a voltage sensing section 22 of control apparatus 20. This voltage value is inputted to input section 21a of main control section 21.

Outer handle switch 31, inner handle switch 32, driver operating switch 34, rear operating switch 35, and keyless switch 36 generate the opening operation signals and the closing operation signals in accordance with the respective operation. These operation signals are inputted into input section 21a of main control section 21.

Main switch 33 can be changed over between an ON state and an OFF state. When main switch 33 is in the ON state, each of the operation signals of outer handle switch 31 and inner handle switch 32 is effective. When main switch 33 is in the OFF state, each of the operation signals of outer handle switch 31 and inner handle switch 32 is ineffective.

Output section 21b of main control section 21 is electrically connected with motor 10a and electromagnetic clutch 10d of opening apparatus 10, and the electric actuator respectively.

The electric actuator, full closure sensing switch 30, outer handle switch 31, and inner handle switch 32 each provided in sliding door 2 are always electrically connected with battery 37 and control apparatus 20 provided in vehicle body 3, through electric cables (not shown) extending flexibly between sliding door 2 and vehicle body 3.

Control apparatus 20 includes voltage sensing section 22, a clutch control circuit 23, a PWM control circuit 24, an electric current sensing circuit 27, a motor speed sensing circuit 25, and a drum speed sensing circuit or door speed sensing circuit 26. Clutch control circuit 23 controls electromagnetic clutch 10d to be in the engaged state or in the disengaged state by commands from main control section 21. PWM control circuit 24 controls motor 10a to rotate at a predetermined rotational speed by commands from main control section 21. Current sensing circuit 27 senses electric current outputted from PWM control circuit 24. Motor speed measuring circuit 25 receives a pulse signal outputted from rotation sensor 10f configured to sense the rotational speed of motor 10a, and measures the rotational speed of motor 10a. Door speed measuring circuit 26 is a door speed measuring section configured to measure a rotational speed of rotating drum 10b, that is the speed of movement of sliding door 2 by measuring the pulse signal outputted from rotation sensor 10e configured to sense the rotational speed of rotating drum 10b.

Main control section 21 includes a movement direction sensing section, a counter, a door position measuring section, and a door movement distance measuring section. The movement direction sensing section senses the rotational direction of rotating drum 10b, that is the movement direction of sliding door 2 in accordance with two phase pulse signals outputted from rotation sensor 10e. The counter counts the pulse signals outputted from rotation sensor 10e in a range from fully closed position 2A to full open position 2C of sliding door 2. The door position measuring section measures the position of sliding door 2 in accordance with the count value of the counter. The door movement distance measuring section measures the movement distance of sliding door 2.

When sliding door 2 moves from the open position to fully closed position 2A, count value N of the counter is reset in accordance with the fully closing signal generated by full closure sensing switch 30, so that the initial value of the counter becomes zero. When sliding door 2 is moved from fully closed position 2A in the opening direction, the count value of the counter starts necessarily from zero. Accordingly, even when cable 10c of opening apparatus 10 has been stretched by secular variations, it is possible to sense the position of sliding door 2 accurately for the long duration.

Input section 21a of main control section 21 receives the opening operation signal (or the closing operation signal) of the remote control of driver operating switch 34, rear operating switch 35 or keyless switch 36, and then main control section 21 controls the electric actuator to release fully closing latch 5 and fully opening latch 6. Main control section 21 controls electromagnetic clutch 10d to be in the engaged state through clutch control circuit 23, and controls motor 10a to rotate in the positive direction (or in the reverse direction) through PWM control circuit 24. Consequently, sliding door 2 is driven by the motor operation by the driving force of motor 10a at a safety speed in the opening direction (or in the closing direction).

When sliding door 2 is moved in the opening direction (or the closing direction) by the operation of outer handle 11 or the inner handle, input section 21a of main control section 21 receives the opening operation signal (or the closing operation signal) of outer handle switch 31 or inner handle switch 32. Main section 21 controls electromagnetic clutch 10d to be in the engaged state through clutch control circuit 23, and controls motor 10a to rotate in the positive direction (or the inverse direction) through PWM control circuit 24. Consequently, the opening and closing movement of sliding door 2 are changed over from the manual operation to the motor operation.

In this control apparatus, the changeover from the manual operation to the motor operation can be performed only in the ON state of main switch 33. In the OFF state of main switch 33, the operation signals of outer handle switch 31 and inner handle switch 32 are ineffective. Accordingly, when outer handle 11 or the inner handle is operated, sliding door 2 can be opened and closed by the manual operating force without controlling motor 10a and electromagnetic clutch 10d to drive sliding door 2.

When open position 2B and a stop of sliding door 2 are measured in accordance with the count value of the counter while electromagnetic clutch 10d is in the disengaged state, when the door movement distance measuring section measures, in accordance with the pulse signal generated from rotation sensor 10e, a first predetermined distance L1 of movement of sliding door 2 (corresponding to 40 pulse of the pulse signal generated by rotation sensor 10e) (as shown in FIG. 2) from open position (stop position) 2B to a position M1 (or M2) in the slope direction (leftward direction in FIG. 1) within a predetermined time to from a time at which sliding door 2 is stopped at open position 2B, and then measures a second predetermined distance L2 of movement of sliding door 2 (corresponding to 20 pulse of the pulse signal generated by rotation sensor 10e) from position M1 in the slop direction, or when door speed measuring section 26 measures a speed equal to or greater than a predetermined speed during the movement of first predetermined distance L1 of sliding door 2 from open position 2B (stop position) to position M1 in the slope direction, main control section 21 is configured to perform a door movement sensing drive control to control electromagnetic clutch 10*d* to be in the engaged state through clutch control circuit 23, and to drive sliding door 2 to move in the slope direction (opening direction or closing direction) at the safety speed by controlling motor 10*a* to rotate in the positive direction or in the reverse direction.

Accordingly, for example, when vehicle 1 is stopped at the slope, it is possible to prevent sliding door 2 from moving fast in the slope direction (the closing direction or the opening direction) by the self weight.

Moreover, main control section 21 does not perform the door movement sensing drive control when second predetermined distance L2 is not measured after first predetermined distance L1 is measured, that is when sliding door 2 is moved slightly by the wind or by the vibration when occupants get on and off the vehicle. Main control section 21 does not perform the door movement sensing drive control when first predetermined distance L1 is not measured within a predetermined time t1 from a time at which sliding door 2 is stopped, that is when slide door 2 is moved slowly while the vehicle is stopped at the gentle slope.

Accordingly, when the vehicle is stopped at the flat road (including the gentle slope), sliding door 2 is not driven unnecessarily because sliding door 2 is not moved in the slope direction by the self weight.

Even when sliding door 2 is moved in the opening direction (or the closing direction) from fully closed position 2A (or full open position 2C) being the stop position, it is possible to drive sliding door 2 by the door movement sensing drive control like mentioned above. In this case, in consideration of the extension of the cable, a first predetermined distance L3 (or L4) measured from fully closed position 2A (or full open position 2C) is set to be longer than first predetermined distance L1 measured when sliding door 2 is located at open position 2B. A second predetermined distance L5 (or L6) measured from a position at which sliding door 2 is moved first predetermined distance L3 (L4) is set to be substantially equal to second predetermined distance L2 mentioned above.

Moreover, when sliding door 2 is stopped at the open position while the vehicle is stopped at the flat road, sliding door 2 is moved a distance adding second predetermined distance L2 to first predetermined distance L1 or at a speed equal to or greater than the predetermined speed, by being pushed by the hands in the opening direction or in the closing direction without operating outer handle 11 or the inner handle, it is possible to drive slide door 2 by the door movement sensing drive control.

In the illustrated embodiment, the control section is configured to measure a distance of movement of the sliding door in the opening direction and the closing direction, and to perform a door movement sensing drive control to bring the clutch from the disengaged state to the engaged state when a measured distance of movement of the sliding door from a stop position to a position in one of the opening direction and the closing direction reaches a first predetermined distance and then a measured distance of movement of the sliding door from the position in the one of the opening direction and the closing direction reaches a second predetermined distance, and to drive the sliding door in one of the opening direction and the closing direction by the driving force of the driving source. Accordingly, it is possible to drive the sliding door at the safety speed by the driving force of the driving source only in a case in which the sliding door may be moved in the slope direction by the self weight.

The control section measures a speed of the movement of the sliding door, and performs the door movement sensing drive control when the measured speed is equal to or greater than a predetermined speed during the movement of the first predetermined distance of the sliding door. Therefore, it is possible to decelerate the sliding door immediately to the safety speed by the driving force of the driving source when the door speed exceeds the predetermined speed.

The control section measures a speed of the movement of the sliding door, and performs the door movement sensing drive control when the measured speed is equal to or greater than a predetermined speed during the movement of the second predetermined distance of the sliding door. The control section does not perform the door movement detecting control when the sliding door is slightly moved by external factors. Therefore, it is possible to control surely.

The control section does not perform the door movement sensing control when the second predetermined distance of the movement of the sliding door is not measured after the first predetermined distance of the movement of the sliding door is measured. Therefore, when the sliding door is not moved in the slope direction while the vehicle is stopped at the flat road (including at the gentle slope), the sliding door is not driven unnecessarily.

The control section does not perform the door movement sensing drive control when the first predetermined distance of the movement of the sliding door is not measured within a predetermined time from a time at which the sliding door is stopped at the stop position. Therefore, when the sliding door is not moved in the slope direction while the vehicle is stopped at the flat road (including at the gentle slope), the sliding door is not be driven unnecessarily.

The control section includes a door position measuring section configured to measure a position of the sliding door in accordance with a signal from a movement signal generating section configured to generate the signal in accordance with the movement of the sliding door. Accordingly, it is possible to control in accordance with the sliding door position.

The control section resets a count value of the door position measuring section in response to a fully closing signal from a full closure sensing section configured to sense a fully closed position of the sliding door. Therefore, it is possible to measure the position of the sliding door always accurately.

The control section includes a door movement distance measuring section configured to measure the distance of the movement of the sliding door in accordance with a signal from a movement signal generating section configured to generate the signal in accordance with the movement of the sliding door. Accordingly, it is possible to decelerate the sliding door surely to the safety speed by the driving force of the driving source in a case in which the sliding door may be moved by the self weight in the slope direction.

The control section includes a door speed measuring section configured to measure a speed of the movement of the sliding door in accordance with a signal from a movement signal generating section configured to generate the signal in accordance with the movement of the sliding door. Therefore, it is possible to decelerate the sliding door to the safety speed by the driving force of the driving source when the speed of the sliding door exceeds the predetermined speed.

The control section controls the driving source and the clutch to drive the sliding door to move in one of the opening direction and the closing direction in response to an operation of an operating handle provided in the sliding door. Therefore, the opening and closing movement of the sliding door can be changed over from the manual operation to the motor operation in response to the operation of the operating handle.

The control section performs the door movement sensing control irrespective of a switching state of a main switch configured to change over between a permission and an inhibition of drive operation of the driving source and the clutch in accordance with the signal of the operating handle sensing section. Therefore, even when the main switch is in the off state, it is possible to move the sliding door at the safety speed by the driving force of the driving source in the case in which the sliding door may be moved in the slope direction by the self weight.

This application is based on a prior Japanese Patent Application No. 2004-338471. The entire contents of the Japanese Patent Application No. 2004-338471 with a filing date of Nov. 24, 2004 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A sliding-door opening control apparatus for a vehicle, comprising:
 a sliding door arranged to be moved in an opening direction and a closing direction along a side face of the vehicle;
 a driving source arranged to drive the sliding door to move in the opening direction and the closing direction;
 a clutch arranged to connect the driving source and the sliding door in an engaged state and to disconnect the driving source and the sliding door in a disengaged state; and
 a control section that controls the driving source and the clutch, measures a distance of movement of the sliding door in the opening direction and the closing direction, and controls a speed of movement of the door by
 (1) changing the clutch from the disengaged state to the engaged state when a measured distance of movement of the sliding door from a stop position to a position in one of the opening direction and the closing direction reaches a first predetermined distance within a predetermined time and then a measured distance of movement of the sliding door from the position in the one of the opening direction and the closing direction reaches a second predetermined distance, and
 (2) driving the sliding door to move in the one of the opening direction and the closing direction by controlling the driving source.

2. The sliding-door opening control apparatus as claimed in claim 1, wherein the control section measures a speed of the movement of the sliding door, and controls movement of the sliding door when the measured speed is equal to or greater than a predetermined speed during the movement of the first predetermined distance of the sliding door.

3. The sliding-door opening control apparatus as claimed in claim 1, wherein the control section measures a speed of the movement of the sliding door, and controls movement of the sliiding door when the measured speed is equal to or greater than a predetermined speed during the movement of the second predetermined distance of the sliding door.

4. The sliding-door opening control apparatus as claimed in claim 1, wherein the control section does not control movement of the sliding door when the second predetermined distance of the movement of the sliding door is not measured after the first predetermined distance of the movement of the sliding door is measured.

5. The sliding-door opening control apparatus as claimed in claim 1, wherein the control section does not control movement of the sliding door when the first predetermined distance of the movement of the sliding door is not measured within a predetermined time from a time at which the sliding door is stopped at the stop position.

6. The sliding-door opening control apparatus as claimed in claim 1, wherein the control section includes a door position measuring section configured to measure a position of the sliding door in accordance with a signal from a movement signal generating section configured to generate the signal in accordance with the movement of the sliding door.

7. The sliding-door opening control apparatus as claimed in claim 6, wherein the control section resets a count value of the door position measuring section in response to a fully closing signal from a full closure sensing section configured to sense a fully closed position of the sliding door.

8. The sliding-door opening control apparatus as claimed in claim 1, wherein the control section includes a door movement distance measuring section configured to measure the distance of the movement of the sliding door in accordance with a signal from a movement signal generating section configured to generate the signal in accordance with the movement of the sliding door.

9. The sliding-door opening control apparatus as claimed in claim 1, wherein the control section includes a door speed measuring section configured to measure a speed of the movement of the sliding door in accordance with a signal from a movement signal generating section configured to generate the signal in accordance with the movement of the sliding door.

10. The sliding-door opening control apparatus as claimed in claim 1, wherein the control section controls the driving source and the clutch to drive the sliding door to move in one of the opening direction and the closing direction in response to an operation of an operating handle provided in the sliding door.

11. The sliding-door opening control apparatus as claimed in claim 10, wherein the control section includes an operating handle sensing section configured to generate a signal in accordance with the operation of the operating handle.

12. The sliding-door opening control apparatus as claimed in claim 11, wherein the control section controls movement of the slidng door irrespective of a switching state of a main switch configured to change over between a permission and an inhibition of drive operation of the driving source and the clutch in accordance with the signal of the operating handle sensing section.

13. A sliding-door opening control apparatus for a vehicle, comprising:
 a sliding door arranged to be moved in an opening direction and a closing direction along a side face of the vehicle;
 first means for driving the sliding door to move in the opening direction and the closing direction;
 second means for connecting the first means and the sliding door in a first state, and disconnecting the first means and the sliding door in a second state; and
 third means for controlling the first means and the second means, for measuring a distance of movement of the sliding door in the opening direction and the closing direction, and for controlling a speed of the door movement by bringing the second means from the second state to the first state when a measured distance of movement of the sliding door from a stop position to a position in one of the opening direction and the closing direction reaches a first predetermined distance within a predetermined time from a time at which the sliding door is stopped at the stop position and then a measured distance of movement of the sliding door from the position in the one of the opening direction and the closing direction reaches a second predetermined distance, and driving the sliding door to move in the one of the opening direction and the closing direction by the first means.

* * * * *